United States Patent [19]

Ku

[11] 4,193,389
[45] Mar. 18, 1980

[54] SOLAR RADIANT ENERGY UMBRELLA

[76] Inventor: Paul H. Y. Ku, 47-50 59th St./6E, Woodside, N.Y. 11377

[21] Appl. No.: 847,767

[22] Filed: Nov. 2, 1977

[51] Int. Cl.² ............................................. F24J 3/02
[52] U.S. Cl. ..................... 126/451; 165/105; 126/433
[58] Field of Search ............... 126/270, 271; 237/1 A; 60/641; 165/105

[56] References Cited

U.S. PATENT DOCUMENTS

| | | | |
|---|---|---|---|
| 742,961 | 11/1903 | Boone | 126/271 |
| 1,345,758 | 7/1920 | Folsom | 126/271 |
| 2,247,830 | 7/1941 | Abbot | 126/271 |
| 2,760,920 | 8/1956 | Olsen | 126/270 |
| 2,994,318 | 8/1961 | Lee | 126/270 |
| 3,643,648 | 2/1972 | Tarcici | 126/270 |
| 4,010,614 | 3/1977 | Arthur | 126/270 |
| 4,018,212 | 4/1977 | Hein et al. | 126/271 |
| 4,030,890 | 6/1977 | Diggs | 126/271 |

FOREIGN PATENT DOCUMENTS

| | | | |
|---|---|---|---|
| 2446580 | 4/1976 | Fed. Rep. of Germany | 126/271 |
| 512526 | 10/1920 | France | 126/271 |

Primary Examiner—James C. Yeung

[57] ABSTRACT

In a preferred embodiment, an umbrella has a reflective concave face serving a radiant energy collector when the umbrella is invertedly mounted, and a clamp clamps onto the umbrellas shaft a vessel containing water partially filling the same, the vessel being of narrow thickness and being supported at a point of converging reflected rays of energy, the vessel having upper steam space connected to a heating-vessel for heating typically a cup of coffee by heat-exchange with the coffee cup, and having a drain conduit for draining condensed steam back to the liquid-containing vessel, a steam conduit channeling steam through a liquid trap for removing water droplets carried by the steam, and the umbrella when upright serving as typically a beach umbrella which shifts with the wind by virtue of the shaft being off-set from the center.

8 Claims, 4 Drawing Figures

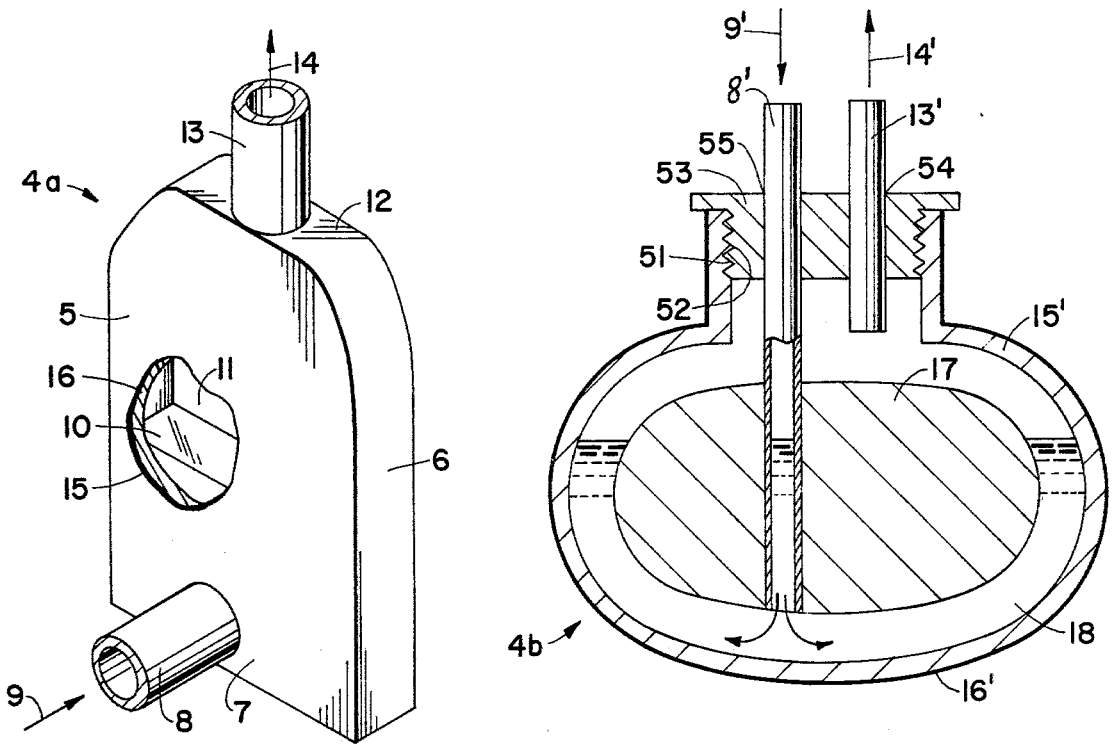
FIG. 1A
FIG. 1B
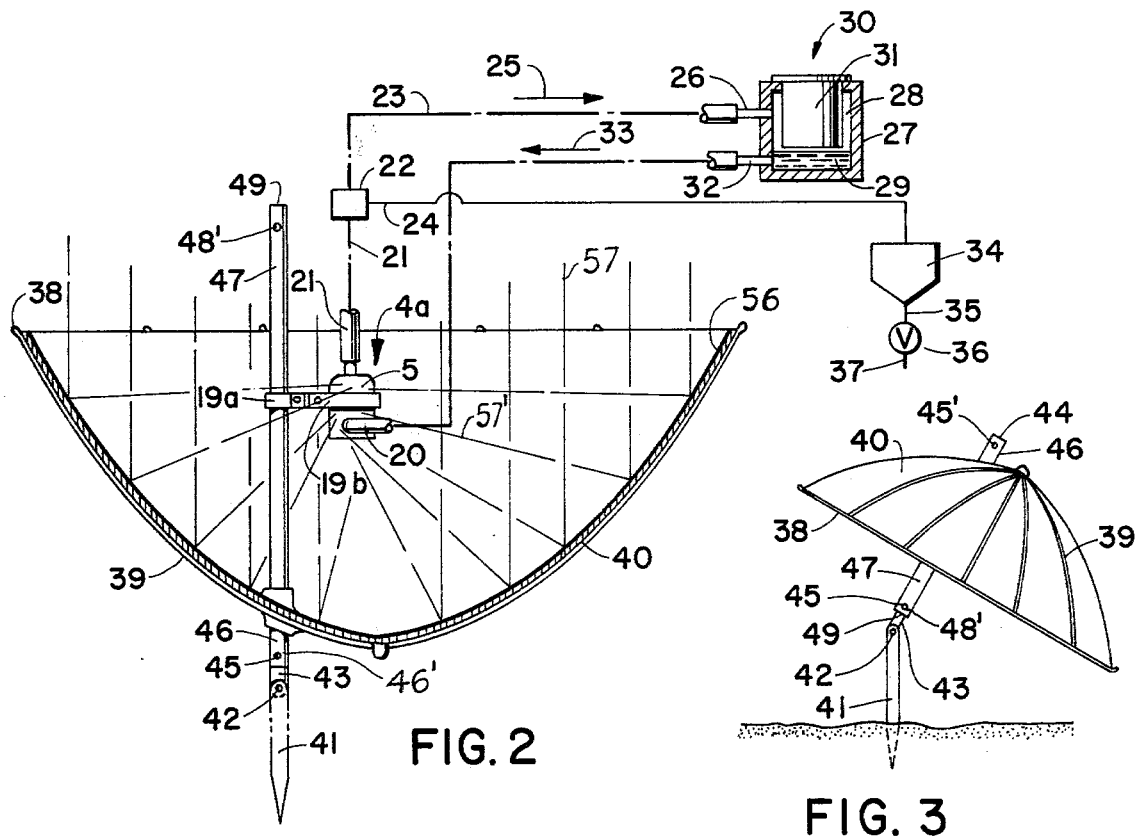
FIG. 2
FIG. 3

SOLAR RADIANT ENERGY UMBRELLA

THE SPECIFICATION

This invention relates to solar radiant energy and a device and method of harnessing the energy, for use when camping.

BACKGROUND TO THE INVENTION

Prior to the present invention there has not been any quick and easy way of utilizing radiant solar energy for constructive purposes of cooking and the like, devoid of cumbersom equipement, adding to the problems of normally already too much baggage when going camping, hiking, to the beach or the like.

SUMMARY OF THE INVENTION

Accordingly, objects of the present invention include the obtaining of a multipurpose device and method of obtaining efficient harnessing of solar radiant energy.

Another object is to provide a novel beach umbrella having a second utility as a cooker or food warmer.

Another object is to obtain a beach umbrella which will withstand normally destructive winds, by virtue of shifting with the wind.

Another object is to obtain a novel steam-producing vessel and combination thereof with an energy concentrator. Another object is to achieve foregoing objects at reduced economic costs.

Other objects become apparent from the preceding and following disclosure.

One and more of preceding objects are obtained by the preferred and other illustrated embodiments intended to improve understanding of controlling principles, but not limiting the scope to solely the illustrated embodiments, obvious variations and mechanical equivalents being also included.

Broadly the invention may be described as a method and a device for carrying-out the method, which broadly includes the concentration of light rays onto a thin layer of vaporizable liquid contained within an enclosure providing a small amount of steam or vapor space thereabove, which vapor space is made to communicate with matter such as food normally within a vessel, to be heated or cooked. The controlling principle of the invention is the concept of concentrating the greatest possible radiant energy by the focusing or the reflection of light rays to a common focus point on the face of or within a body of vaporizable liquid such as water having a minimum of volume and thereby water initially struck by concentrated radiant energy being prevented from having the heat content thereof dissipate into adjacent major quantities of cool water spaced-away from any point that rays might strike it; thereafter, the substantially instantly vaporized liquid is collected in minimal space to avoid storage heat dissipation to surrounding surfaces, and the matter to be heated being either suspended within the steam space, or alternately the steam being channeled in the shortest possible conduit with as much insulation as is reasonably possible, to the point of direct heating or of heating through a heat-exchange-wall such as the wall of a food-containing vessel; a further principle involved is the utilization of steam to heat the food, rather than having food sitting in a quantity of water or other vaporizable liquid—it being a principle source of speedy loss of heat energy by radiation and/or conduction when there is a major volume of liquid such as water, and of containing equipement, and the like. Therefore, the controling though is to concentrate preferably light preferably by inexpensive reflection onto a very thin layer of a small quantity of water preferably confined to the area of focus of the concentrated light, with a small steam collection space directing the steam speedily to the matter to be heated. By the emphasis being placed on steam or vapor heat-energy, the heat-released is at an optimal maximum during the release of heat-energy at condensation, as compared to minor caloric content——and a low maximum possibility, when heating directly from—for example, mere hot water, or other vaporizable liquid. Water because of normal ample avaiability and non-toxicity is preferred to other liquids such as oils, or the like, much less alcohol or antifreeze or equivalent liquids.

In understanding a major principle of the invention, an understanding of such being necessary to appreciate the inventive concept, further following comment will be made. In a body of water were large in virtually infinite proportions, and in contrast, if merely a very small surface area of a surface of that body of water were subjected to normal sunlight rays in parallel as occur in normal sunlight, the heat-energy of absorbed sun light would be proportional first to the location on the earth's surface, as well as dependant upon whether filtered by cloud cover or the like. Secondly, for whatever quantity of light energy does strike the predetermined small surface area during a given period of time, it may be said that the total energy is proportional to the time of exposure; accordingly, if one waited long enough, a particular total quantity of any desired amount of energy could eventually be effected. However, from a practical point of view, such procedure would not be of any value for heating or cooking purposes unless there were a high-efficiency storage facility available such as a swimming pool insulated, or the like as are utilized; in such event, the heat retained would be insufficient for cooking much less for an inexpensive camping unit. Thus, heat dissipation through loss of heat by cooling to environmental structures and/or air or the like, normally dissipate heat more quickly or as quickly as the same is absorbed from the sunlight, under the situation described above. Next, with an unlimited body of water, the heat absorbed converted from the radiant energy of the sun light rays, becomes diluted by the heat-absorption of adjacent molecules of water of the large volume of adjacent water, such that, together with loss of heat from the entire body of water considered with also the larger body to be heated by the small exposure to sunlight rays, the overall temperature of the water would never reach a practically high temperature sufficient to be of any value for cooking, much less within a brief period of time, and much less with a simple portable and inexpensive structure of device.

Thus, the present invention embodies the elimination of the presence of water-body not having direct surface exposure to the radiant energy sunlight rays, and also the invention concentrates light rays preferably by reflection to a common point, to increase the quantity of heat absorption per unit of time, while concurrently avoiding the cooling of the heated water by virtue of cooling/heat-distribution among large quantities of adjacent water. In addition, there is the additional concept that if the food (or vessel containing food) were immersed directly in the water being heated, firstly a larger quantity of water would be required, and secondly the temperature of the food or food-containing vessel could not rise above the "mean" (average) of the temperature of the water being heated (still cool, since always there has to be some water to be heated at the radiant energy-exposure point) and any steam (if sufficient heat were available to cause conversion to steam after heat dissipation to the large quantity of water and the food (or vessel) absorbing heat) that might be present. Accordingly, another feature of the present invention is to make sure, as provided above, that ample steam is produceable, followed by the thereafter subjecting the food (or food vessel) to exposure to solely (or at least primarily) the steam, and not the water from which the steam is produced. In further enhancement, the steam is scrubbed of water droplets, whereby the rapidly-produced steam is sufficient to heat or cook food, such as eggs, bacon, coffee, or the like. As indicated in the Figures, or otherwise, the scrubbed water and/or steam condensate may be recycled, in order to benefit from residual heat content thereof, maximizing efficiency. Also, it is to be recognized that while the present invention is primarily directed to a portable camping or picnicing unit, the above-described principle and structure of the invention may be employed on a larger scale to other heating and/or cooking or energy-units.

Another advantage to the circular umbrella arrangement for the present concept, is the benefit of availability to concentrate rays of radiant energy as sunlight, from all points around 360 degrees onto a small localized surface area, permitting both concentration of heat thereby as well as avoiding heat dissipation over a large area, as well as the water in the small area being held to a low(small) volume thereby also.

Theoretical maximum heat energy from the sun shine on the earth's surface, a solar constant, is 1340 watts per square meter, or 1.92 calories per square centimeter per minute, or 424.7 BTU per hour per square foot.

The actual solar heat energy in New York City on Aug. 9, 1977 at 7:30 AM was 150 BTU per hour per square foot, and at 8:30 AM on Aug. 5 was at about 200 BTU per hour per square foot, and at noon on Aug. 5 was between 250–300 BTU per hour per square foot; all of this data was measured by a Solar Meter Model 776 Dodge Products, Houston, Texas.

The area of a 3 foot diameter circle provides 7.0686 Sq. ft.; this area at 8:30 AM/New York City can typically collect therefore about 1413.72 BTU per hour per foot, or 23.56 BTU per minute per 3 ft diameter.

To heat a pound (two cups) of water from 60° F. to 212° F. requires 152 BTU. Accordingly, for a 3 foot diameter area at 23.56 BTU per minute, 6.6 minutes would be required.

For a larger area as would be provided typically by a beach umbrella of 6 foot diameter, the total area is about 28 square feet, and 8:30 AM New York (8/7/77) would give 5,600 BTU/Hr. or 93.0 BTU per minute, whereby a cup of water (or coffee) would boil (reach boiling temperature) [requiring ½ of 152 BTU] from an initial temperature of 60°, within about one minute assuming 100% efficiency, which of course is not possible, but serves as a guide and goal in any event.

By the present invention, the concentration of this heat to a centralized small surface area and the utilization of maximum exposure of all water-volume molecules to radiant energy rays, and minimal dilution of heat energy by non-exposed water molecules by holding non-exposed molecules to a minimum, and heating by exposure to steam, results in optimizing efficiency closer to theoretical possibilities.

Further to above-noted data, the BTU requirement to heat one pound of water to produce steam therefrom for changing from water at 212° F. to steam at 212° F., is 1000 BTU; however, note that in most instances it is not contemplated to heat a food material to produce steam therefrom; accordingly while greater amounts of energy would be required initially to produce the steam that will heat the food (or food vessel), and while for every pound of steam-condensate 1000 BTU will have been given-up, the actual needed BTU above-calculated for heating the cup of coffee or water would not be of a large magnitude necessary to boil-away the coffee or water.

Actual efficiency of a concentration of light rays by reflection on the shinny inner surface of a hemisphere of an inverted beach-umbrella of the present invention, is about 99%; BTU production is at about 80% efficiency, or 160 BTU at 8:30 AM on 8/5/77; heat dissipation is about 5% of this amount, leaving about 152 BTU/Hr/Sq.ft., which for a 6 ft. diameter would produce 4297 BTU/Hr. or 71.6 BTU per minute, whereby a cup of water (half-pound) would be heated in about one minute, from 60° F. to 212° F. (excluding any amount of heat needed to convert the water being radiated from the 2.2°-water to the 212°-steam). Actual experience has demonstrated about three minutes time required, utilizing a constructed device of this invention.

It is to be recognized that much speedier results are obtainable during summer than winter, and nearer the equator.

The invention may be better understood by making reference to the following Figures.

THE FIGURES

FIG. 1A illustrates a perspective side view with partial cut-away for improved illustration, liquid-containable boiler vessel, and inlet and outlet conduits thereof for channeling-in condensate of steam and for channeling-out steam from the steam-space of the vessel.

FIG. 1B illustrates in side cross-sectional view, an alternate embodiment of liquid-containable boiler vessel, and inlet and outlet conduits thereof.

FIG. 2 illustrates a side partial cross-sectional view of solar radient energy umbrella cooking device symbolically illustrating the both structure and mechanism of operation, diagrammatically, with the umbrella in an inverted state.

FIG. 3 illustrates another view in side view of the umbrella of the FIG. 2 embodiment, except in this view the umbrella portion being utilized solely as a shade-producing umbrella in the upright position.

DETAILED DESCRIPTION OF THE INVENTION

Most broadly the invention defined, the invention above-described may be considered to be a method which includes the causing of radient energy to be concentrated onto a focus point (area) localized where there exists a thin layer of vaporizable liquid such as water held within a small volume of space providing a minor and minimum amount of effective steam-collection space, and contacting the steam produced by vaporization of the water, with a material such as food or a food-containable vessel either within the steam space or to which the steam is channelled. The thin layer of water (or comparable liquid) is sufficiently small as to readily vaporize as a result of concentrated heat energy absorbed thereby. The steam space above the water (or other liquid) surface is sufficiently small as to effect a miximal contact of vapor (steam) therein with the matter to be heated, rather than having a large steam reservoir serving no good purpose and from which enlarged outer peripheral surfaces of the volume (space) thereof would be subject to a higher total amount of heat dissipation/loss.

As noted-above, further embodiments of the invention include the combination of elements for practicing the method, as well as including a multi-use beach umbrella having also special utility of shifting with the wind, thereby avoiding likelihood of wind-damage to the umbrella.

More particularly, with reference to the various Figures, for common elements of the same embodiments the same indicia are utilized, and for corresponding elements of different embodiments, "prime" indicia are utilized for corresponding elements. FIGS. 1A and 2 represent a common embodiment, for the steam-producing boiler vessel of FIG. 1A; likewise, the FIG. 3 illustrates a common umbrella in an upright-usage state, as compared to the same umbrella in an inverted-usage state of harnessing solar energy as a part of the greater combination.

In FIG. 1A, liquid-containable vessel 4a is a steam-producing boiler vessel having opposite parallel faces 5 defining therebetween thin space 11 which in operation has upper steam free-space and in the lower portion thereof water 10, the thin space corresponding to narrow-width wall faces 6, resulting in a maximum exposure of water 10 to heated wall-thickness 15 of the surrounding vessel structure, with a minimum of volume space-away from contact with surrounding wall structure. At a lower portion 7 of the vessel, there is located a steam-condensate return inlet-conduit 8 for condensate traveling inwardly in direction 9, and at upper portion 12 there is the steam outlet conduit 13 for steam traveling outwardly in the direction 14. Illustrative cut-away makes possible the showing of thickness and existence of darkened (preferably black) heat-absorbing layer 16 as an outer-coating, preventing also reflection.

As well as having corresponding elements, the FIG. 1B embodiment typically represent a spherical embodiment-vessel 4b having a central preferably metallic block 17 occupying substantially all central interior space whereby the water layer 18 is thin thereby providing that most water volume has the water molecules thereof in close proximity to vessel wall structure receiving the radiant energy rays.

It should be understood that it is contemplated that the boiler vessel walls may be transparent, but such is not preferred because normally there would be a greater reflection loss of radiant energy.

In the FIG. 1B embodiment, a further benefit of the central metallic block 17 is that as heat is absorbed by that block, it becomes a heater, heating water molecules coming in contact therewith; normally, however, such would be considered a "constant", once initially quickly heated.

Also in the FIG. 1B embodiment, there is a neck portion having inner female threads 52 for receiving the male threads 51 of plug 53 which has apertures 54 and 55 for the outlet and inlet conduits 13' and 8' respectively.

With regard to FIG. 2, clamps 19a and 19b support the liquid-containable vessel 4a on the shaft 47, the conduit 20 being continuous with the FIG. 1A inlet conduit 8, and conduit 21 being continuous with the steam outlet 13, to liquid trap 22 from which steam travels through conduit 23 in direction 25 into heater vessel inlet 26 into heater vessel 27 having steam-space 28 and condensate 29, with the food vessel 30 having a lip that thereby suspends the food vessel with the container-portion 31, the food vessel 30 being typically a cup. Condensate 29 leaves by outlet structure 32 in direction 33 in conduit 20. The conduit 24 drains collected water from the conventional liquid trap 22, carrying the same to vessel 34, periodically or otherwise drained by valve 36 in line 35 into line 37. The conduit 24 may alternately drain directly into line 20 if desired. Conventional technology is employed to prevent back-pressures, allowing the water to freely drain into vessel 34.

The solar collection of energy typically works by the sun lights rays as diagrammatically illustrated, striking the inner shiny coating 56 as rays 57 in parallel from the sun and reflected rays 57' onto face 5, for example. The umbrella 40, has reinforcing ribs 39 and supporting outer ring 38, these being of any conventional material such as plastic or metal. Stake 41 has hinge-pin 42 connecting mounting shaft 43 which includes depressible conventional button 45 which when extended locks into the tube-portion 46 in aperture 46' thereof, and into tube portion 49 of shaft 47 by aperture 48' as shown in the FIG. 3 illustration. The hinged shaft 43 is wedge-fitted such that position is normally held fixedly unless manually manipulated to a new desired position. Pin 42 may also be of the type that may be tightened and loosened alternately.

It is within the scope of the invention to make variations and substitution of equivalents within the ordinary skill of an artisan in this field of art.

I claim:

1. A device for harnessing radiant solar energy comprising in combination: an elongated supporting structure, a concave reflective surface adapted to receive a plurality of rays of radiant energy such that reflected rays converge to a substantially common point substantially coincident with space associated with the concave reflective surface, said elongated supporting structure including a first end extending from said reflective surface in juxtaposition to and spaced-from said common point, and an opposite remaining end of said elongated supporting structure extending from an opposite face of the concave reflective surface and adapted for supporting the concave reflective surface in a predetermined energy ray-receiving position; clamping means for clamping a liquid-containable vessel onto said first end of said elongated supporting structure, adapted such that a liquid-containable vessel supported by said clamping means is positioned substantially at said common point; and as the liquid-containable vessel, a liquid-containable vessel of predetermined shape at said common point, the predetermined shape being characterized to maintain liquid adjacent inner wall surfaces of the liquid-containable vessel and within a thickness range below a predetermined maximum layer-thickness such that liquid volume does not exceed volume required for absorbing all energy transmitted through said inner wall surfaces; and a vaporizable liquid within the liquid-containable vessel in an amount of said thickness range below said predetermined maximum layer-thickness of a volume sufficient to absorb substantially all heat energy transmitted through said adjacent inner wall surfaces, whereby excessive energy dilution is avoided and heat energy is obtainable in high concentration within the thickness range, said amount being insufficient to fill a predetermined minimum of substantially enclosed space above liquid level of said liquid sufficiently to provide for collection of vapor vaporized by heat within said liquid, and vapor channeling means for channeling vapor from said enclosed space to a heating vessel into enclosure space thereof, and as said heating vessel, a liquid-containable heating vessel connected to receive vapor by said vapor channeling means, said vapor channeling means including a liquid-trapping means for trapping liquid physically carried by vapor from the enclosed space passing through said vapor channeling means.

2. A device of claim 1, in which each of opposite ends of said elongated supporting structure is adapted for alternately supporting the concave reflective surface at variable angles, alternately as a ray collector and as a shade-providing umbrella.

3. A device of claim 1, including liquid return means for channeling condensed liquid from said liquid-containable heating vessel into a lower inner space of said heating vessel.

4. A method for harnessing radiant solar energy, comprising in combination: arranging a concave reflective surface to receive a plurality of rays of radiant energy such that reflected rays converge to a substantially common point substantially coincident with space associated with the concave reflective surface; positioning a liquid-containable vessel of predetermined shape at said common point, the predetermined shape being characterized to maintain liquid thickness below a predetermined maximum layer-thickness of liquid adjacent inner wall surfaces of the liquid-containable vessel; maintaining a predetermined amount of liquid within said liquid-containable vessel in an amount sufficient to absorb substantially all heat energy transmitted through said adjacent inner wall surfaces and up to said predetermined maximum layer-thickness sufficient to avoid excessive energy dilution and to obtain concentration of heat energy within said predetermined maximum layer-thickness of liquid, and concurrently maintaining a predetermined minimum substantially enclosed space above liquid-level sufficient for collection of vapor vaporized by heat within said liquid; and channeling liquid-carrying vapor from said enclosed space to a heating vessel into enclosure space thereof and trapping liquid physically-carried by said liquid-carrying vapor during said channeling.

5. A method of claim 4, including draining condensed liquid from the enclosure space of the heating vessel, into a lower portion of liquid-containable space of the liquid-containable vessel.

6. A method of claim 5, including heating matter removably placed within the enclosure space in heat-transfer relationship with hot vapor within the enclosure space, and thereafter removing the matter in a heated state.

7. A method of claim 6, including placing the matter into a container before said heating, and placing the container with the matter-contents thereof within the enclosure space.

8. A method of claim 4, including placing food matter into said enclosure space in heat-transfer relationship with hot vapor within the enclosure space, and utilizing water as said liquid.

* * * * *